Patented Mar. 27, 1945

2,372,440

UNITED STATES PATENT OFFICE 2,372,440

PROCESS FOR THE MANUFACTURE OF COMPOUNDS OF THE CYCLOPENTANO-POLY-HYDROPHENANTHRENE SERIES

Willy Logemann, Berlin-Charlottenburg, Germany, assignor to Schering Corporation, Bloomfield, N. J., a corporation of New Jersey No Drawing. Application September 14, 1938, Serial No. 229,878. In Germany September 18, 1937

1 Claim. (Cl. 260—397.5)

In Specification No. Ser. 153,002 is described a process according to which from compounds of the aetiocholane series with unsaturated side chain on the carbon atom 17 by the action of agents adding on oxygen ethylene oxide-like compounds can be produced.

The subject of the present invention is the conversion of such oxides, which possess the grouping

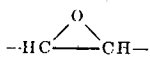

into compounds of the type of the corpus luteum hormones and other substances of hormone like action.

The cyclopentano - polyhydrophenanthrene compounds serving as starting materials can be saturated or unsaturated in the ring system provided that they contain on the carbon atom 17 a side chain in which an oxygen bridge is situated between two carbon atoms connected together. In particular such steroid compounds are suitable in which the oxygen bridge is present between the carbon atoms 20 and 21. The ring system can in addition be substituted in any suitable manner; primarily those compounds are of particular importance in which in 3-position is present an oxo or hydroxyl group or a group which can be reconverted into the said groups, for example by hydrolysis, as for example an ester or ether group, halogen or the like. Such compounds are for example 3,17-dihydroxy-20,21-oxido pregnane; 3.17-dihydroxy-20,21-oxido pregnene; 3-hydroxy-20,21-oxido pregnane; 3-hydroxy-20,21-oxido pregnene, and so on.

The process of the present invention consists in that the oxygen bridge present in the side chain of the said compounds is split by means of reducing agents so that the epoxy alkane chain is converted into an open carbon chain containing an alcohol group.

As reducing agents can be employed nascent hydrogen, as is produced for example from amalgams, such as sodium amalgam, activated aluminium or alkali metals as for example sodium and alcohol and the like. Suitably, however, hydrogen activated catalytically for example by metals is employed in which case noble metal catalysts such as platinum oxide according to Adams-Shriner and also nickel catalysts and the like can find application. In this manner reducible substituents in the ring system, as for example keto groups, may likewise be reduced if they are not protected in a suitable manner, for example by conversion into derivatives which are not susceptible to reduction.

In the case of compounds unsaturated in the ring system it is suitable to employ such reducing agents as are not capable of saturating the double bond or to protect the double bond in a suitable manner prior to the action of the reducing agent.

The compounds obtained in this manner can finally be converted, for example by splitting off of water, hydrogenation and oxidation, into compounds of the type of the corpus luteum hormone or into other substances of hormone like action. As agents splitting off water can find application for example mineral acids, phosphorus oxyhalides, bisulphates, anhydrous metal salts, such as dehydrated copper sulphate, formic acid, oxalic acid, acid anhydrides and the like. Instead of these agents or in combination therewith there can also be employed corresponding conditions such as heating to elevated temperature, in particular in indifferent gases and/or under reduced pressure. By this means there are produced from the secondary alcohols chiefly enol compounds which, being unstable as such, are converted into the corresponding ketones.

For the oxidation of any secondary hydroxyl groups present to ketone groups there can be employed the known oxidising agents, as for example chromic acid and glacial acetic acid, permanganate and the like. There can, however, also be employed dehydrogenating agents as for example metals or metal oxides of the copper, iron or platinum group, if desired under reduced pressure in the presence of inert gases and/or in combination with hydrogen acceptors. Such hydroxyl groups as are not intended to undergo oxidation or dehydrogenation are temporarily protected for example by esterification or etherification. In the oxidation it is to be recommended in general intermediately to protect double bonds present, particularly in the ring system, for example by addition of halogen or halogen hydride.

The process may be illustrated by means of the following formulae:

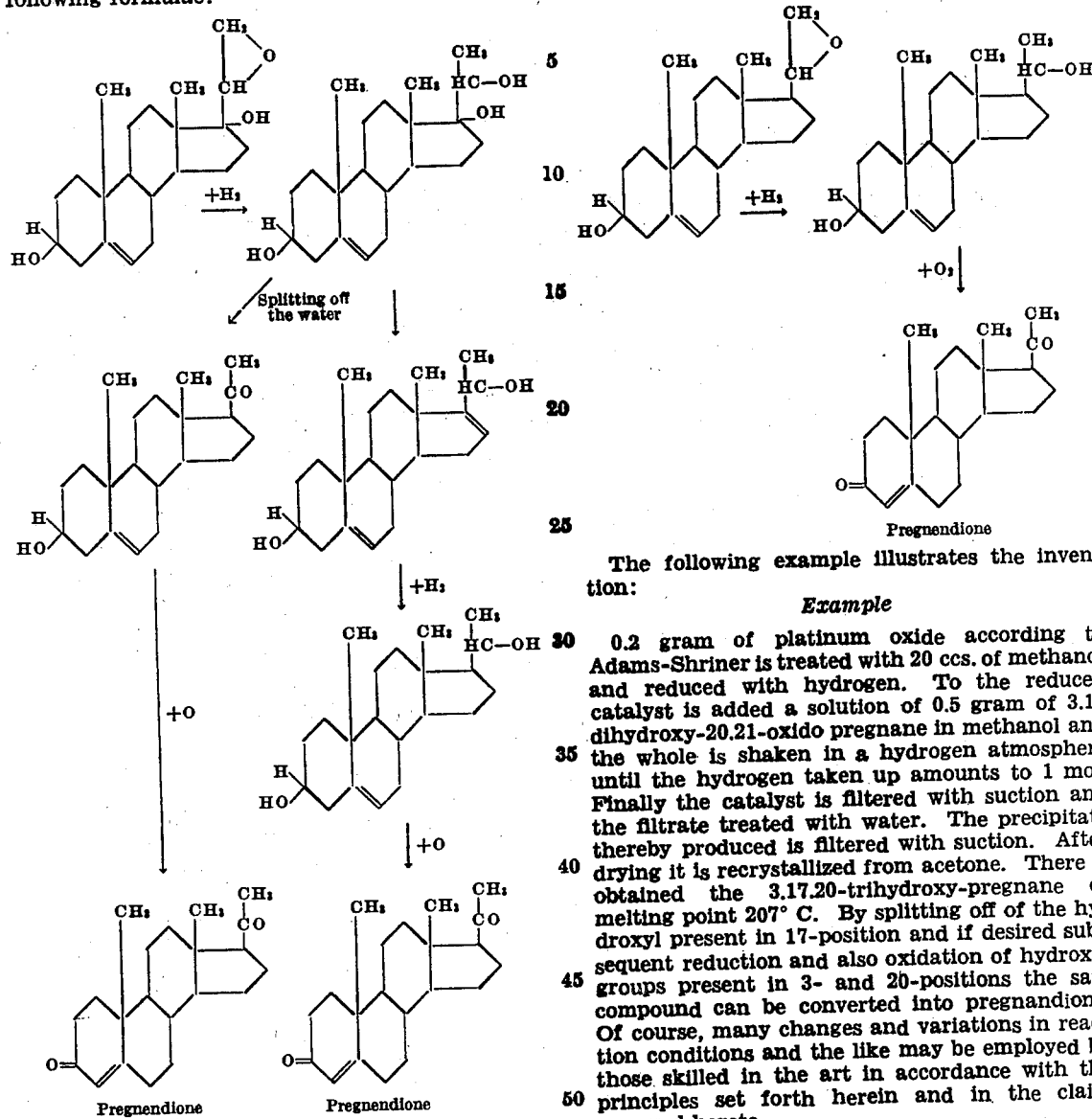

If for the present process an oxido compound is employed in which no hydroxyl group is present on the carbon atom to which is attached the side chain with the oxide ring, but a hydrogen atom, then the reaction takes place, for example, in the following manner:

The following example illustrates the invention:

*Example*

0.2 gram of platinum oxide according to Adams-Shriner is treated with 20 ccs. of methanol and reduced with hydrogen. To the reduced catalyst is added a solution of 0.5 gram of 3.17 dihydroxy-20.21-oxido pregnane in methanol and the whole is shaken in a hydrogen atmosphere until the hydrogen taken up amounts to 1 mol. Finally the catalyst is filtered with suction and the filtrate treated with water. The precipitate thereby produced is filtered with suction. After drying it is recrystallized from acetone. There is obtained the 3.17.20-trihydroxy-pregnane of melting point 207° C. By splitting off of the hydroxyl present in 17-position and if desired subsequent reduction and also oxidation of hydroxyl groups present in 3- and 20-positions the said compound can be converted into pregnandione. Of course, many changes and variations in reaction conditions and the like may be employed by those skilled in the art in accordance with the principles set forth herein and in the claim annexed hereto.

What I claim is:

3, 17, 20-trihydroxy-pregnene.

WILLY LOGEMANN.